United States Patent
Baur et al.

(10) Patent No.: US 9,771,881 B2
(45) Date of Patent: *Sep. 26, 2017

(54) METHOD FOR CONTROLLING AN INTERNAL COMBUSTION ENGINE

(71) Applicant: Dr. Ing. h.c. F. Porsche Aktiengesellschaft, Stuttgart (DE)

(72) Inventors: Peter Baur, Moensheim (DE); Moritz Martiny, Karlsruhe (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 317 days.

This patent is subject to a terminal disclaimer.

(21) Appl. No.: 14/547,161

(22) Filed: Nov. 19, 2014

(65) Prior Publication Data
US 2015/0149061 A1 May 28, 2015

(30) Foreign Application Priority Data
Nov. 25, 2013 (DE) .......................... 10 2013 112967

(51) Int. Cl.
*F02D 41/00* (2006.01)
*B60W 10/00* (2006.01)
(Continued)

(52) U.S. Cl.
CPC ........... *F02D 29/02* (2013.01); *F02D 41/022* (2013.01); *F02D 41/1497* (2013.01);
(Continued)

(58) Field of Classification Search
CPC ...... F02D 2200/1004; F02D 2200/101; B60W 2501/0657; B60W 2710/0666
See application file for complete search history.

(56) References Cited

U.S. PATENT DOCUMENTS 5,459,662 A * 10/1995 Tezuka .................... B60K 28/16
123/333
6,609,056 B1 * 8/2003 Czarnecki .............. B60K 31/04
477/110
(Continued)

FOREIGN PATENT DOCUMENTS

DE 102004044193 A1 4/2006
DE 102005004224 A1 8/2006
(Continued)

*Primary Examiner* — Tisha Lewis
(74) *Attorney, Agent, or Firm* — Leydig, Voit & Mayer, Ltd.

(57) ABSTRACT

A method controls an internal combustion engine having a drive output shaft that is coupled to an input shaft of a transmission. The internal combustion engine and the transmission are encompassed by a drivetrain for the drive of a motor vehicle. The method includes determining a rotational speed of the drive output shaft of the internal combustion engine and determining a rotational acceleration of the drive output shaft based on the rotational speed of the drive output shaft. A dynamic torque of the internal combustion engine is determined as a product of the rotational acceleration and a dynamic moment of inertia of the internal combustion engine. A maximum combustion torque of the internal combustion engine is determined from a sum of a predetermined maximum torque at the input shaft of the transmission and the dynamic load torque of the internal combustion engine.

6 Claims, 2 Drawing Sheets

(51) Int. Cl.
  *F02D 29/02*   (2006.01)
  *F02D 41/02*   (2006.01)
  *F02D 41/14*   (2006.01)

(52) U.S. Cl.
  CPC ........... *F02D 2200/1004* (2013.01); *F02D 2200/1012* (2013.01); *F02D 2200/602* (2013.01); *F02D 2250/18* (2013.01); *F02D 2250/26* (2013.01)

(56) References Cited

U.S. PATENT DOCUMENTS

| | | | | |
|---|---|---|---|---|
| 6,652,418 | B1* | 11/2003 | Gutknecht-Stohr | B60W 10/06 477/120 |
| 2006/0116806 | A1* | 6/2006 | Steen | B60W 10/06 701/51 |
| 2009/0118934 | A1* | 5/2009 | Heap | B60K 6/365 701/54 |
| 2009/0229897 | A1* | 9/2009 | Yutani | B60K 6/445 180/65.28 |
| 2013/0179019 | A1 | 7/2013 | Morimoto | |

FOREIGN PATENT DOCUMENTS

| | | |
|---|---|---|
| DE | 102008046849 A1 | 3/2010 |
| DE | 102013200175 A1 | 7/2013 |

\* cited by examiner

METHOD FOR CONTROLLING AN INTERNAL COMBUSTION ENGINE

CROSS REFERENCE TO RELATED APPLICATIONS

Priority is claimed to German Patent Application No. DE 10 2013 112 967.6, filed on Nov. 25, 2013, the entire disclosure of which is hereby incorporated by reference herein.

FIELD

The invention relates to a method for controlling an internal combustion engine, wherein it is the intention for a predetermined maximum input torque to be adhered to at a transmission connected downstream.

BACKGROUND

As part of the continuous improvement of a motor vehicle, it is sought to make drive components of the motor vehicle as small and lightweight as possible. In order that a drive component nevertheless still exhibits adequate strength, it is normally optimized for a predetermined loading. Advanced methods for component dimensioning make it possible for the elements of the drive component to be calibrated precisely for a predetermined load configuration. In this way, the drive components can perform their function without problems even over relatively long periods of time, and can at the same time be small and lightweight. The driving performance of the motor vehicle can be improved in this way. A level of wear resistance of the component can be adapted for a predetermined service life.

This approach makes it possible for the drive components to be coordinated precisely with one another. However, if one of the components is changed, for example by virtue of an internal combustion engine for the drive of the motor vehicle being modified in terms of its power characteristic, its maximum torque or its maximum rotational speed, this may make it necessary for drive components that are connected to the internal combustion engine, such as for example a transmission or a clutch, to be redesigned, reconstructed or retested. Such an adaptation involves high numbers of personnel, high outlay in terms of costs and time, and a certain amount of risk.

To reduce this additional outlay, it is normally the case that, at least in a low gear with a high speed reduction ratio, the torque of the internal combustion engine is reduced in order to restrict the torque in the rest of the drivetrain of the motor vehicle. Said reduction is normally performed to a predetermined, fixed value. Owing to the fixed torque limitation, however, the driving performance of the motor vehicle can be adversely affected.

DE 10 2013 200 175 A1 presents a drive power output device for a motor vehicle. An engine and multiple motor-generators are connected to one another in non-positively locking fashion. If a torque of one of the motor-generators is restricted, the torque of the other motor-generator is corrected such that a change in the torque at the engine or at a downstream assembly is restricted.

DE 10 2008 046 849 A1 relates to a technique for controlling an internal combustion engine of a drivetrain of a motor vehicle. During a gearshift process in a transmission, a drive-imparting internal combustion engine is controlled by means of a target rotational speed regulator with a two-stage setpoint rotational speed profile.

SUMMARY

In an embodiment, the present invention provides a method for controlling an internal combustion engine having a drive output shaft that is coupled to an input shaft of a transmission. The internal combustion engine and the transmission are encompassed by a drivetrain for the drive of a motor vehicle. The method includes determining a rotational speed of the drive output shaft of the internal combustion engine and determining a rotational acceleration of the drive output shaft based on the rotational speed of the drive output shaft. A dynamic torque of the internal combustion engine is determined as a product of the rotational acceleration and a dynamic moment of inertia of the internal combustion engine. A maximum combustion torque of the internal combustion engine is determined from a sum of a predetermined maximum torque at the input shaft of the transmission and the dynamic load torque of the internal combustion engine.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
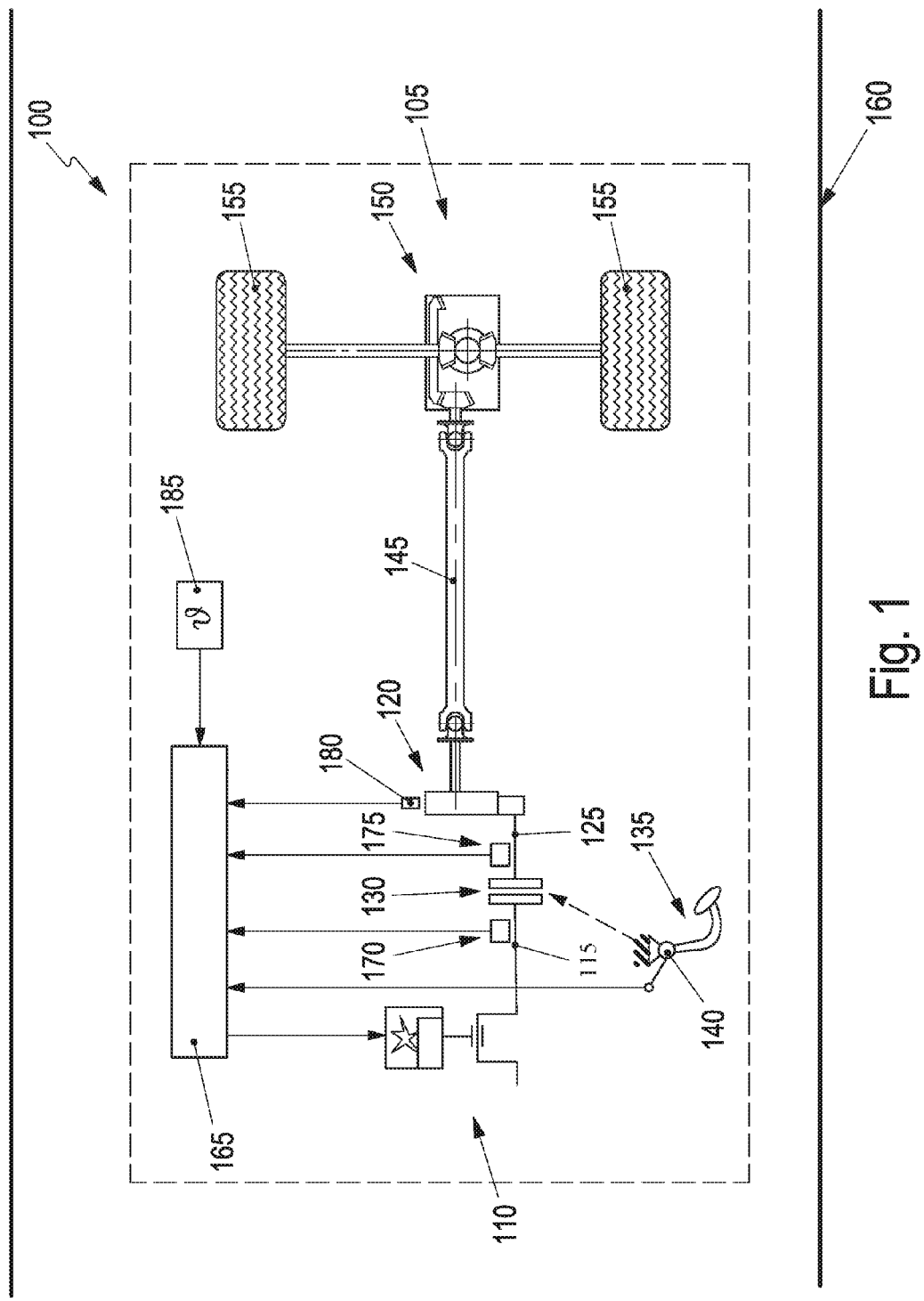
FIG. 1 shows a motor vehicle having a drivetrain.

An aspect of the present invention provides, in a drivetrain for the drive of a motor vehicle, the control of a drive engine for the drive of a transmission such that the transmission is not overloaded, while at the same time, use can be made of as far as possible unhindered power delivery of the internal combustion engine for driving the motor vehicle.

An internal combustion engine comprises a drive output shaft that is coupled to an input shaft of a transmission, wherein the internal combustion engine and the transmission are encompassed by a drivetrain for the drive of a motor vehicle. A method according to the invention for controlling the internal combustion engine comprises the steps of determining a rotational speed of the drive output shaft of the internal combustion engine, of determining a rotational acceleration of the drive output shaft on the basis of the rotational speed of the drive output shaft, of determining a dynamic torque of the internal combustion engine as a product of the rotational acceleration and an invariant rotationally acting inertial mass of the internal combustion engine, and of determining a maximum combustion torque of the internal combustion engine from a sum of a predetermined maximum torque at the input shaft of the transmission and the dynamic load torque of the internal combustion engine.

In the event of a change in engine rotational speed, the rotationally acting mass moment of inertia of the internal combustion engine generates a dynamic torque, hereinafter referred to as dynamic load torque, which counteracts the sign of the change in rotational speed. The sign of the dynamic load torque is negative in the event of acceleration or an increase in engine rotational speed, and is positive in the event of deceleration of the engine rotational speed or a decrease in engine rotational speed. The sum of all of the co-rotating masses fastened to the engine output shaft (crankshaft, camshaft drive, pistons, connecting rods, etc.) yields the "overall mass moment of inertia" of the internal combustion engine. This will hereinafter be referred to as mass moment of inertia of the internal combustion engine.

The dynamic load torque of the internal combustion engine is calculated from the product of the change in engine rotational speed and the mass moment of inertia of the internal combustion engine.

The dynamic load torque of the internal combustion engine is the torque that must be imparted in order to increase the rotational speed of the internal combustion engine itself, without taking into consideration a load connected downstream, such as the drivetrain. The combustion torque provided by the internal combustion engine is always provided at the drive output shaft of the internal combustion engine minus the dynamic load torque. In the described manner, the maximum combustion torque of the internal combustion engine can be raised to a value greater than the maximum torque at the input shaft of the transmission. In relation to a static restriction of the combustion torque, it is ultimately possible in this way for more torque to be made available in the drivetrain without the maximum torque at the input shaft of the transmission being exceeded. The driving behavior of the motor vehicle can be improved in this way. In particular, a critical component of the drivetrain, such as for example a bevel gear, a crown gear, a shaft bearing or a toothing of a gearwheel pair of the transmission, can at the same time be protected more effectively against overloading. The service life of the transmission, and possibly of the rest of the drivetrain, can be lengthened in this way. The described technique can be used both for transmission types but is particularly suitable for use in a motor vehicle with a transmission whose different gear stages can be selected manually (manually operated transmission).

According to the invention, the sum of the combustion torque of the internal combustion engine and the dynamic load torque of the internal combustion engine is limited to the maximum admissible transmission input torque. If there is demanded of the internal combustion engine a torque that would result in the sum of the combustion torque and the dynamic load torque being higher than the maximum admissible transmission input torque, the internal combustion engine can be controlled in such a way that correspondingly less combustion torque is generated, such that the maximum admissible transmission input torque is not exceeded.

For as long as the sum of combustion torque and dynamic load torque does not exceed the maximum admissible transmission input torque, the combustion torque of the internal combustion engine can be controlled as a function of the demanded torque. In this way, the restriction of the combustion torque of the internal combustion engine can intervene only when the driver or an automatic process demands of the internal combustion engine a torque that leads to an overloading of the transmission or of an element in the drivetrain.

The rotational acceleration of the drive output shaft is advantageously determined on the basis of a derivation of the rotational speed of the drive output shaft with respect to time. The rotational speed of the drive output shaft is normally already available as a value on board the motor vehicle, and is normally determined with high accuracy and high reliability. In one embodiment, a dedicated sensor is provided for determining the rotational speed of the drive output shaft; in another embodiment, the rotational speed of the drive output shaft may be gathered from a control unit on board the motor vehicle, in particular from an engine control of the internal combustion engine.

The output shaft of the internal combustion engine can be coupled by means of a clutch to the input shaft of the transmission, wherein the clutch is at least partially closed. In particular, if the internal combustion engine is being operated at a rotational speed at which it can provide a high torque while the input shaft of the transmission is at a relatively low rotational speed, it is possible in this way for the transmission, and possibly the rest of the drivetrain, to be protected against excessive torque.

It is preferably possible for the clutch to be controlled in terms of its opening extent by means of a clutch pedal, wherein a position of the clutch pedal is detected in order to determine whether the clutch is at least partially closed. It is preferably determined that the opening extent of the clutch lies between fully open and fully closed, that is to say the clutch is at least partially slipping and there is slippage between the input and output sides of the clutch.

FIG. 1 shows a motor vehicle 100 having a drivetrain 105. The drivetrain 105 comprises at least one internal combustion engine 110 with a drive output shaft 115 and a transmission 120 with an input shaft 125, wherein the drive output shaft 115 is coupled to the input shaft 125. The shafts 115, 125 are coupled rigidly or optionally by means of a clutch 130 that can be at least partially opened by means of a clutch pedal 135, a controllable actuator or some other device. A clutch switch 140 is preferably provided which is connected to the clutch pedal 135 and which serves for providing a signal that indicates whether or not the clutch 130 is fully open.

The drivetrain 105 may also comprise further components. In particular, a Cardan shaft 145, a differential 150 or one or more drive wheels 155 may be arranged at the output side of the transmission 120. The at least one drive wheel 155 is, at its outer circumference, connected in non-positively locking fashion to a road 160, such that the motor vehicle 100 can be driven by virtue of the internal combustion engine 110 providing a combustion torque that is transmitted, as power, via the drivetrain 105 to the road 160.

The internal combustion engine 160 is preferably controlled by means of a control device 165. The combustion torque that is provided is preferably controlled by the control device 165 by virtue of actuators being used for example to control a flow rate of the injected fuel, a flow rate of combustion air supplied, an ignition time, or an inlet or outlet time. The control device 165 normally controls the internal combustion engine 160 as a function of a demand for torque. Here, the internal combustion engine 160 is controlled such that the demanded torque is made available as rapidly as possible at the drive output shaft 115. The demand may for example be controllable by a driver of the motor vehicle 100. The demand may however also originate from some other component, for example from a control unit for an electronic stability control system, a drive slip regulation system, or some other assistance system on board the motor vehicle 100.

Furthermore, the control device 165 is designed to restrict the combustion torque as a function of at least one dynamic parameter of the drivetrain 105, such that an input torque acting at the input shaft 125 of the transmission 120 does not exceed a predetermined maximum input torque. For this purpose, as will be explained in more detail further below, the control device 165 may access one or more measurement values.

A rotational speed of the drive output shaft 115 can be determined by means of an optional first rotational speed sensor 170, a rotational speed of the input shaft 125 of the transmission 120 can be determined by means of an optional second rotational speed sensor 175, and an engaged gear stage of the transmission 120 can be determined by means of an optional gear selection sensor 180. The transmission 120 preferably comprises multiple gear stages that can be engaged alternatively. The gear stages normally provide different speed reduction ratios between the input shaft 125 and the output shaft, which in this case is connected by way of example to the Cardan shaft 145, of the transmission 120. Furthermore, the control device 165 may be connected to a speed sensor 185 for determining the speed of the motor vehicle 100 or to an interface for connecting to a control device that provides the speed of the motor vehicle 100.

Figure 2:
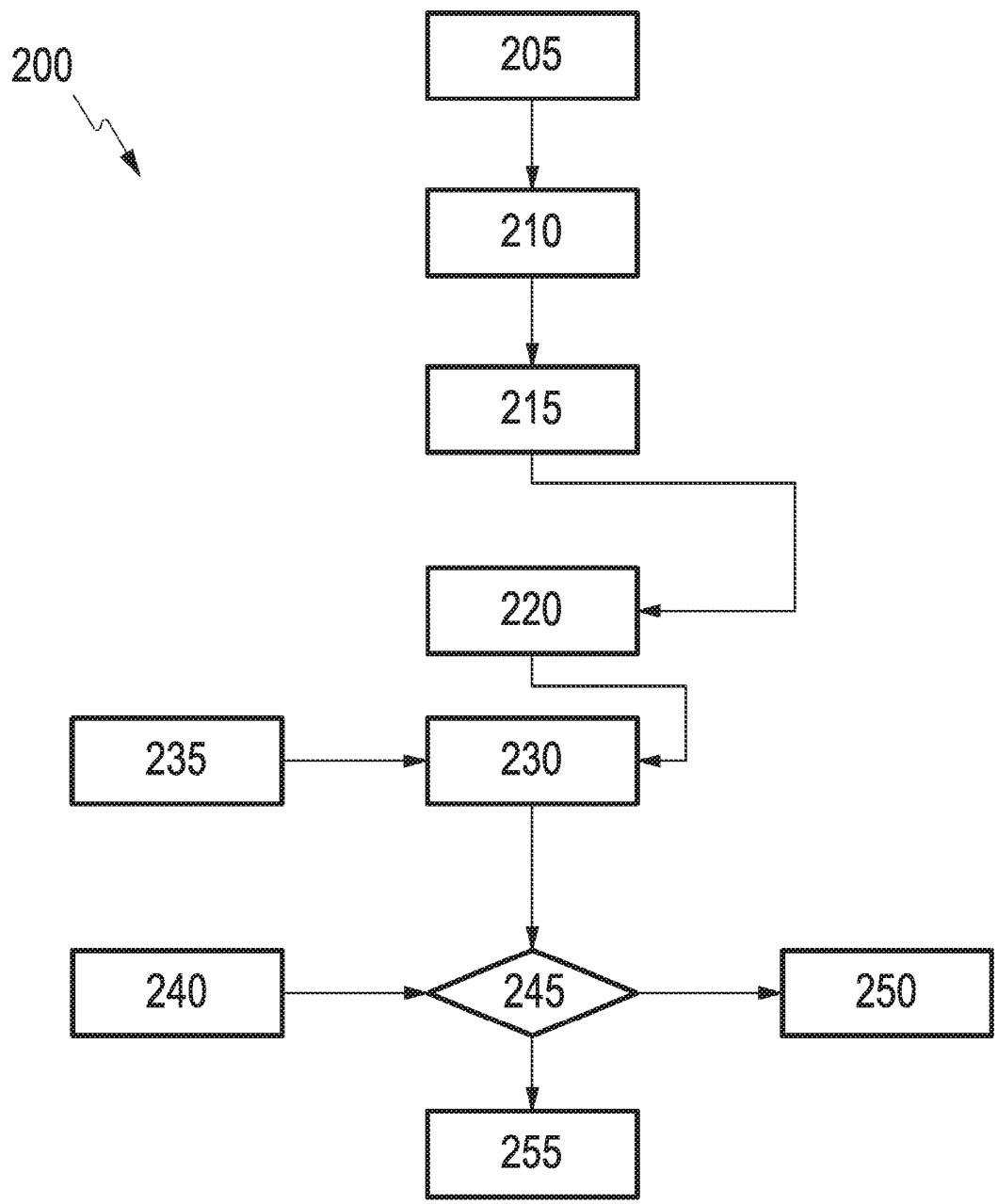
FIG. 2 shows a flow diagram of a method for controlling the internal combustion engine from FIG. 1.

FIG. 2 shows a flow diagram of a method 200 for controlling the internal combustion engine from FIG. 1. The method 200 is in particular configured for being executed on the control device 165. During normal operation of the motor vehicle 100, the clutch 130 is fully closed and the rotational speeds of an input side of the clutch 130, which is connected to the drive output shaft 115 of the internal combustion engine 110, and of an output side of the clutch 130, which is connected to the input shaft 125 of the transmission 120, are equal. Likewise, in this state, rotational accelerations of the input and output sides of the clutch are equal.

In an optional first step 205, it is determined that the clutch 130 is not fully open. A partial opening of the clutch 130 is preferably nevertheless performed, such that there is slippage between an input side and the output side of the clutch and the rotational speeds of the two sides differ from one another. The determination may be performed in particular on the basis of the signal from the clutch switch 140. In one embodiment, the method 200 may terminate already after the step 205 if the clutch 130 is fully open or fully closed. In yet a further embodiment, the method may also terminate after the step 105 if the clutch 130 is not fully closed.

Otherwise, in a step 210, a rotational speed of the drive output shaft 115 of the internal combustion engine 110 is determined Said rotational speed may be detected by means of a sensor or may be gathered, for example via an interface, from some other control device, for example for the control of the internal combustion engine 110. The rotational speed of the internal combustion engine is commonly determined within the context of the control of said internal combustion engine, and said rotational speed can be provided as a frequently updated value.

In a step 215, the rotational acceleration of the drive output shaft 115 of the internal combustion engine 110 is determined. For this purpose, it is possible in particular for the rotational speed determined in step 210 to be derived with respect to time. Alternatively, the rotational acceleration of the drive output shaft 115 may also be determined in some other way, for example by means of a corresponding sensor. Furthermore, the rotational acceleration of the drive output shaft 115 may also be gathered, via an interface, from a control unit on board the motor vehicle 100.

In a step 220, a dynamic torque of the internal combustion engine 110 is determined on the basis of the rotational acceleration of the input shaft 125 of the transmission 120.

For this purpose, in one embodiment, the rotational acceleration determined in step 215 is multiplied by a moment of inertia of the internal combustion engine 110. The moment of inertia may be predefined as a parameter of the internal combustion engine 110. The dynamic torque expresses what amount of torque, out of the combustion torque provided by the internal combustion engine 110, is expended in increasing the rotational speed of the internal combustion engine 110 itself. The torque provided by the internal combustion engine 110 at the drive output shaft 115 of the internal combustion engine 110 is lower, by the magnitude of the dynamic torque, than the combustion torque provided by the internal combustion engine 110.

In a step 230, a maximum admissible combustion torque of the internal combustion engine 110 is determined on the basis of the dynamic torque. For this purpose, it is possible in particular for the dynamic torque and a maximum admissible torque of the transmission 120, as determined in a step 235, to be added together. The maximum combustion torque may therefore exceed the maximum torque of the transmission 120 by the magnitude of the dynamic torque. Since the dynamic torque of the internal combustion engine 110 is not available at the drive output shaft 115, it is nevertheless the case here that the maximum torque of the transmission 120 at the input shaft 125 is not exceeded.

The determined maximum combustion torque may be used to restrict the internal combustion engine 110 in terms of its provided combustion torque. For this purpose, a torque that is demanded of the internal combustion engine 110 may be determined in a step 240. The demand may for example be determined from a driver-controlled pedal value or on the basis of a demand from a control unit which implements, for example, a further driving assistance function on board the motor vehicle 100. In a subsequent step 245, it is then checked whether the demanded torque exceeds the maximum combustion torque determined in step 230. If this is not the case, then in a step 250, the internal combustion engine 110 is controlled so as to output the demanded torque. Here, in one embodiment, the combustion torque of the internal combustion engine 110 may exceed the demanded torque by the magnitude of the dynamic torque determined in step 220. In another embodiment, the combustion torque of the internal combustion engine 110 corresponds to the demanded torque as determined in step 240.

If it is determined in step 245 that the demanded torque exceeds the maximum combustion torque, then in a step 255, the internal combustion engine 110 is preferably controlled so as to provide the maximum combustion torque from step 230.

The increase of the combustion torque of the internal combustion engine 110 beyond the maximum torque at the input shaft 125 of the transmission 120 may be implemented whenever the rotational motion of the drive output shaft 115 of the internal combustion engine 110 is subject to acceleration. If the rotational speed of the internal combustion engine 110 is constant, then in step 215, the rotational acceleration is determined as being 0, such that the dynamic torque of the internal combustion engine 110 in step 220 is likewise 0. In this case, the maximum combustion torque determined in step 230 corresponds to the maximum torque of the transmission 120 at the input shaft 125 thereof.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for controlling an internal combustion engine having a drive output shaft that is coupled to an input shaft of a transmission, the internal combustion engine and the transmission being encompassed by a drivetrain for the drive of a motor vehicle, and the method comprising the steps of:

determining a rotational speed of the drive output shaft of the internal combustion engine;

determining a rotational acceleration of the drive output shaft based on the rotational speed of the drive output shaft;

determining a dynamic load torque of the internal combustion engine as a product of the rotational acceleration and a dynamic moment of inertia of the internal combustion engine, the dynamic load torque being a torque generated by a rotationally acting mass moment of inertia of the internal combustion engine in the event of a change in engine rotational speed; and determining a maximum combustion torque of the internal combustion engine from a sum of a predetermined maximum torque at the input shaft of the transmission and the dynamic load torque of the internal combustion engine.

2. The method as recited in claim 1, wherein the combustion torque of the internal combustion engine is restricted to a maximum admissible combustion torque.

3. The method as recited in claim 2, wherein the combustion torque is controlled as a function of a demanded torque for as long as the demanded torque does not exceed a maximum admissible transmission input torque.

4. The method as recited in claim 1, wherein the rotational acceleration of the drive output shaft is determined based on a derivation of the rotational speed of the drive output shaft with respect to time.

5. The method as recited in claim 1, further comprising determining that a clutch for coupling the output shaft of the internal combustion engine to the input shaft of the transmission is at least partially open.

6. The method as recited in claim 5, wherein an extent of opening of the clutch is controllable using a clutch pedal, and the method includes detecting a position of the clutch pedal.

* * * * *